United States Patent [19]

Ward

[11] 4,180,543

[45] Dec. 25, 1979

[54] AMMONIA SYNTHESIS REACTOR HAVING PARALLEL FEED TO PLURAL CATALYST BEDS

[75] Inventor: Stanley A. Ward, Stockton-on-Tees, England

[73] Assignee: Imperial Chemical Industries Limited, London, England

[21] Appl. No.: 891,385

[22] Filed: Mar. 29, 1978

[30] Foreign Application Priority Data

Apr. 18, 1977 [GB] United Kingdom ............... 15943/77

[51] Int. Cl.² ........................... B01J 1/14; B01J 3/04; B01J 7/00; B01J 8/04
[52] U.S. Cl. .................................. 422/148; 422/191; 422/219; 423/360; 423/361
[58] Field of Search ............... 23/288 H, 288 K, 289; 422/148, 191, 219; 423/360, 361

[56] References Cited

U.S. PATENT DOCUMENTS

| 2,512,586 | 6/1950 | Stengel | 23/288 K |
|---|---|---|---|
| 3,432,265 | 3/1969 | McCallister et al. | 23/288 K |
| 3,492,099 | 1/1970 | Sze | 23/288 K |
| 3,622,266 | 11/1971 | Laukel | 23/289 |
| 3,656,900 | 4/1972 | Drechsel et al. | 423/533 |
| 3,784,361 | 1/1974 | Kubec et al. | 23/288 H |
| 3,795,485 | 3/1974 | Bogart | 23/288 K |
| 3,932,139 | 1/1976 | Vilceanu et al. | 23/288 K |
| 3,963,423 | 6/1976 | Dorr et al. | 23/288 K |

FOREIGN PATENT DOCUMENTS

194879 6/1906 Fed. Rep. of Germany ........... 423/529

Primary Examiner—Morris O. Wolk
Assistant Examiner—Bradley Garris
Attorney, Agent, or Firm—Cushman, Darby & Cushman

[57] ABSTRACT

In a reactor suitable for gas-phase catalytic exothermic synthesis, in particular of ammonia or methanol the synthesis gas is reacted in an upstream adiabatic catalytic zone, is cooled in a heat exchanger and then reacted further in a downstream catalytic zone, whereafter preferably it is cooled again, suitably in a boiler or feed water heater, and reacted further in a further catalytic zone. The gas flow through the catalyst is mainly in an axial direction and the pressure drop is kept low by disposing the catalyst in each zone in a plurality of beds fed in parallel from an inlet header and delivered in parallel into an outlet header. The beds may be separately removable from the reactor to facilitate catalyst charging and discharging.

10 Claims, 3 Drawing Figures

AMMONIA SYNTHESIS REACTOR HAVING PARALLEL FEED TO PLURAL CATALYST BEDS

This invention relates to a reactor suitable for gas-phase catalytic exothermic synthesis, in particular of ammonia or methanol.

The requirement for large daily production of ammonia or methanol has posed the problem of designing synthesis reactors affording high output without excessive pressure drop in catalyst beds and without constructional difficulties due to excessive diameter or internal complication. It has been proposed to minimise pressure drop by arranging for the gas to flow through the catalyst bed in a radial direction rather than axially: this, however, decreases the pressure drop so much that the gas flows nonuniformly through the catalyst bed unless additional pressure drop is introduced mechanically, as disclosed in UK Pat. No. 1118750. In order to increase the output of a reactor it has been proposed to keep the temperature down to a level at which a relatively high proportion of ammonia is present (as a result of favourable equilibrium) by subdividing the catalyst and cooling the reactant gas between the bed divisions by means of a heat exchanger: examples of this system, using also radial gas flow, are described in UK Pat. Nos. 1204634 and 1387044. It has also been proposed in UK Pat. No. 1062505 to arrange two or more catalyst baskets, each provided with individual temperature control means, within a single reactor shell, and to connect these for operation in parallel. These proposals result in reactors of complicated structure, entailing a tedious procedure when the catalyst is to be changed.

We have now devised a reactor in which the principle of parallel beds is applied in a new way and is combined with arrangements to control the temperature so as to afford a usefully high proportion of ammonia or methanol in reacted gas and to make possible very effective heat recoveries. Our reactor can be designed for various output levels without changing its diameter, since the parallel flow system makes possible a modular internal construction.

Our reactor is characterised by comprising at least one axial parallel set of catalyst beds, that is, a plurality of adiabatic catalyst beds each having an inlet and an outlet mutually separated in a direction axial of the reactor shell, in combination with inlet header means disposed to feed the catalyst beds in parallel and with outlet header means disposed to receive gas from the catalyst beds in parallel.

The reactor for gas phase catalytic exothermic synthesis comprises
  (a) a cylindrical outer shell having at least one gas inlet and at least one gas outlet;
  (b) at least two axial parallel catalyst bed sets as hereinbefore defined, to be referred to as the upstream and downstream sets;
  (c) a heat exchanger having a cold side in flow communication with a gas inlet of the outer shell and having a hot side in flow communication with the outlet of the upstream bed set and the inlet of the downstream bed set; and
  (d) a flow connection from the downstream bed set to a gas outlet of the outer shell.

Since the catalyst beds in axial parallel set operate with a low pressure drop, the catalyst used can in the form of relatively small particles, especially in the size range 1.5 to 5 mm. Any further catalyst can be present as larger particles, suitably in the size range 6 to 6 to 10 mm if in an axial flow bed; preferably such large particles are used upstream, because the driving force for reaction is greater than downstream. Alternatively, further catalyst can be in a bed of the radial or cross flow type and can then be charged with the relatively small catalyst particles. Each catalyst bed can include an apertured plate at its inlet and/or outlet, for controlling the uniformity of gas flow or possibly for increasing the pressure-drop through the bed.

Although each catalyst bed is substantially adiabatic, there can be cold gas by-pass connections outside the catalyst beds.

The number of catalyst beds in each axial parallel set is proportional to the intended output of the reactor, for a given reactor diameter, since the pressure drop through the catalyst is independent of the number of catalyst beds. A convenient number of beds is 2–5 in each set. Very suitably the upstream set contains two and the downstream set three beds in a reactor of 2 to 2.4 meters internal diameter, 15 to 25 meters high and producing 1000 to 2000 metric tons of ammonia per day.

The invention provides a combination of the reactor with a cooling means downstream of the downstream bed set, followed by further downstream catalyst bed or bed set. The reactor may itself contain the further downstream catalyst, making three beds or sets in all, and the flow connection from the outlet of the first downstream catalyst via a cooling means to the inlet of the further downstream catalyst. Again the second downstream catalyst is preferably in an axial parallel bed set. In principle the reactor could contain the cooling means but it is preferable to take the gas from the first downstream catalyst out of the reactor, pass it through the cooling means and return it to the reactor for reaction in the further downstream catalyst. More conveniently the further downstream catalyst is in a reactor shell separate from the shell containing the upstream set and the first downstream set.

Since the catalyst beds in any set are connected in parallel, it is possible to choose the aspect ratio of each such bed to give uniform gas distribution therein. A suitable ratio of axial length to mean diameter D is the range 0.6 to 1.5, where $D = \sqrt{D_0^2 - D_1^2}$, $D_0$ being the internal diameter of the outer cylinder defining the catalyst bed and $D_1$ the external diameter of an inner axial tube defining the catalyst bed.

Although the inlet and outlet of each catalyst bed are mutually separated in a direction axial of the reactor shell, the gas flow direction through the bed can have a radial component. This can take place when an inlet header feeding an axial parallel bed set is provided by an annular-section space at the periphery of the beds and an outlet header fed by the beds is one or more axial tubes or annular section spaces within the beds, so that the gas flows radially inwards as well as axially. The corresponding arrangement providing a component of gas flow radially outwards is also possible. The relative proportions of axial and radial flow can be controlled by means of gas distribution apertures at the bed inlet and/or outlet.

In a preferred reactor the parallel-connected catalyst beds are separable and removable from the reactor while containing their charge of catalyst. A preferred catalyst bed comprises:
  (a) an outer cylinder;
  (b) at least one tube disposed within the outer cylinder and parallel to its axis;

(c) a catalyst support grid transversely disposed between the outer cylinder and the tube or tubes and defining the bottom of a space to hold catalyst;

(d) at least one inlet port in the outer cylinder or in the tube or tubes above the said space;

(e) at least one outlet port in the outer cylinder or in the tube or tubes below the catalyst support grid;

(f) upward and/or downward extensions formed on the outer cylinder to cooperate with a similar cylinder and/or a heat exchanger above or below to form a continuous structure within an external cylinder defining an external header means;

(g) upward and/or downward extensions of the tube or tubes formed to cooperate with similar tube or tubes of a bed above and/or below to form a continuous tube or tubes defining internal header means or to co-operate with a heat exchanger.

The invention provides also a heat exchanger for use in the reactor in co-operation with such catalyst beds, comprising (a) an outer cylinder;

(b) a lower tube-plate secured gas-tightly to the bottom of the outer cylinder and formed with tube holes;

(c) an upper tube-plate spaced from the lower tube-plate and formed with tube-holes corresponding to those in the lower tube plate;

(d) a plurality of tubes extending between the tube-plates;

(e) inlet and outlet means to the space outside the tubes;

(f) inlet and an outlet header means to the tubes;

(g) extensions formed on the outer cylinder formed to co-operate structurally with the outer cylinder of a catalyst bed of an axial parallel set and disposed above and/or below the heat exchanger;

(h) means to connect the outlet of the space outside the tubes to inlet header means of the catalyst beds upstream of the heat exchanger;

(i) means to connect the tube inlet header means to the outlet header means of the catalyst beds upstream of the heat exchanger;

(j) means to connect the tube outlet header means to the inlet header means of the catalyst beds downstream of the heat exchanger.

In a preferred heat exchanger the inlet means to the space outside the tubes is a single axial inner tube; the heat exchange tubes are then grouped in an annular formation around it. Outside the single axial inner tube there is preferably a coaxial by-pass tube communicating with the outlet end of the space outside the tubes and leading from the exterior of the reactor shell where it is provided with means to connect it to a source of cool gas.

The internal header means provided by the tube or tubes within the outer cylinder of the catalyst beds is preferably a single tube, since then it can be disposed coaxially of the heat exchanger by-pass tube. The internal header means is conveniently in communication with the catalyst support grids, that is, it is an outlet header, and thus it is in communication with the tubes of the heat exchanger.

Preferably the catalyst beds co-operate detachably with one another. However, in order to avoid sealing difficulties, the catalyst bed immediately above the heat exchanger is preferably welded to it.

The assembly of catalyst bed sets and heat exchanger is disposed preferably within a cartridge within the reactor outer shell. The cartridge is made of relatively light-gauge metal since in operation the gas outside it will be at about the same pressure as the gas inside it. There is a space between the cartridge and the outer shell, so that relatively cold gas can be circulated through it to avoid over-heating of the shell by conduction of heat from the cartridge.

The cartridge can be lifted bodily from the reactor if its shell has a full-bore closure, as is preferred. Preferably the cartridge itself has a readily removable, though gas-tight, lid, since then catalyst beds and the heat exchanger can be removed without removing the whole cartridge.

In an important form of the invention the outlet of the downstream bed set is in flow communication with a cooling means which is a boiler or boiler feed water heater. If the reactor is to be used for ammonia synthesis, the cooling means is preferably a boiler, especially one producing steam at over 30 atm. abs., more preferably 50 to 150 atm. abs. Such high-pressure steam is commonly raised in the synthesis gas generation section of ammonia production plants, and thus the steam raised using the reactor according to the invention is preferably fed into a unified system for the plant. If the reactor is to be used for methanol synthesis at under 300° C., as in most modern copper-catalysed synthesis processes, steam can be raised at only up to about 40 atm. abs., and consequently it is generally preferred to heat boiler feed water in the cooling means and pass it under pressure to the boilers of the synthesis gas generation section.

A synthesis plant using such a cooling means comprises also a feed gas preheater downstream (in the reacted gas flow) of that cooling means. The temperature to which the gas is cooled it typically in the range 300°–350° in an ammonia plant, and this is sufficient for heating the feed gas to 250°–300° C., at which it is suitable for cooling the gas leaving the upstream catalyst bed set to the temperature (350°–400° C.) required at the inlet of the first downstream bed set, while itself being heated to the temperature (350°–400° C.) required at the inlet of the upstream catalyst bed set. Reacted gas at 300°–350° C. contains usable heat and is now cooled in further heat exchanges, suitably with water for the production of medium pressure steam (20–50 atm. abs.,) or pressurised feed water for the high pressure boilers mentioned above, and with cold gas recycled from the product separator mentioned below. Finally it is cooled by water or air or by refrigeration, to below the dew point of ammonia, and passed to a separator, from which product ammonia is taken as bottoms and unreacted gas is taken overhead, for recycle to the reactor.

The invention is especially applicable to ammonia synthesis. In such a synthesis the pressure is typically in the range 100–500 atm. abs., especially up to 250 atm. abs. The strike temperature of the catalyst is typically in the range 300°–400° C. and the gas entering any of the catalyst beds is conveniently at a temperature in the range 350°–430° C. The outlet temperature of each catalyst bed is suitably in the range 450°–540° C., but is lower for the downstream beds than in the upstream bed owing to the smaller quantity of ammonia formed in the downstream beds. Typically the first bed set outlet temperature is 510°–530° C., that of the second set 470°–490° C. and that of the third set (if one is used) 430°–450° C.

The invention is applicable also to the synthesis of methanol over a zinc-chrome catalyst at 300°–400° C., 150–450 atm. abs. Such reaction temperatures are high enough to permit production of high pressure steam in the same manner as in ammonia synthesis.

In the application of the invention to the synthesis of methanol at catalyst bed outlet temperatures under 300° C. over a copper-containing catalyst, the heat exchange with water can produce medium pressure steam at 20-40 atm. abs., pressure, but more conveniently produces pressurised feed water for the high pressure boilers of the synthesis gas generation section, as described in our U.K. Pat. Nos. 1484366, 4065483 and German application 2529591.

The invention in preferred forms is illustrated by the accompanying drawings, in which FIG. 1 is a sectional elevation of the reactor;

Figures 1, 2:
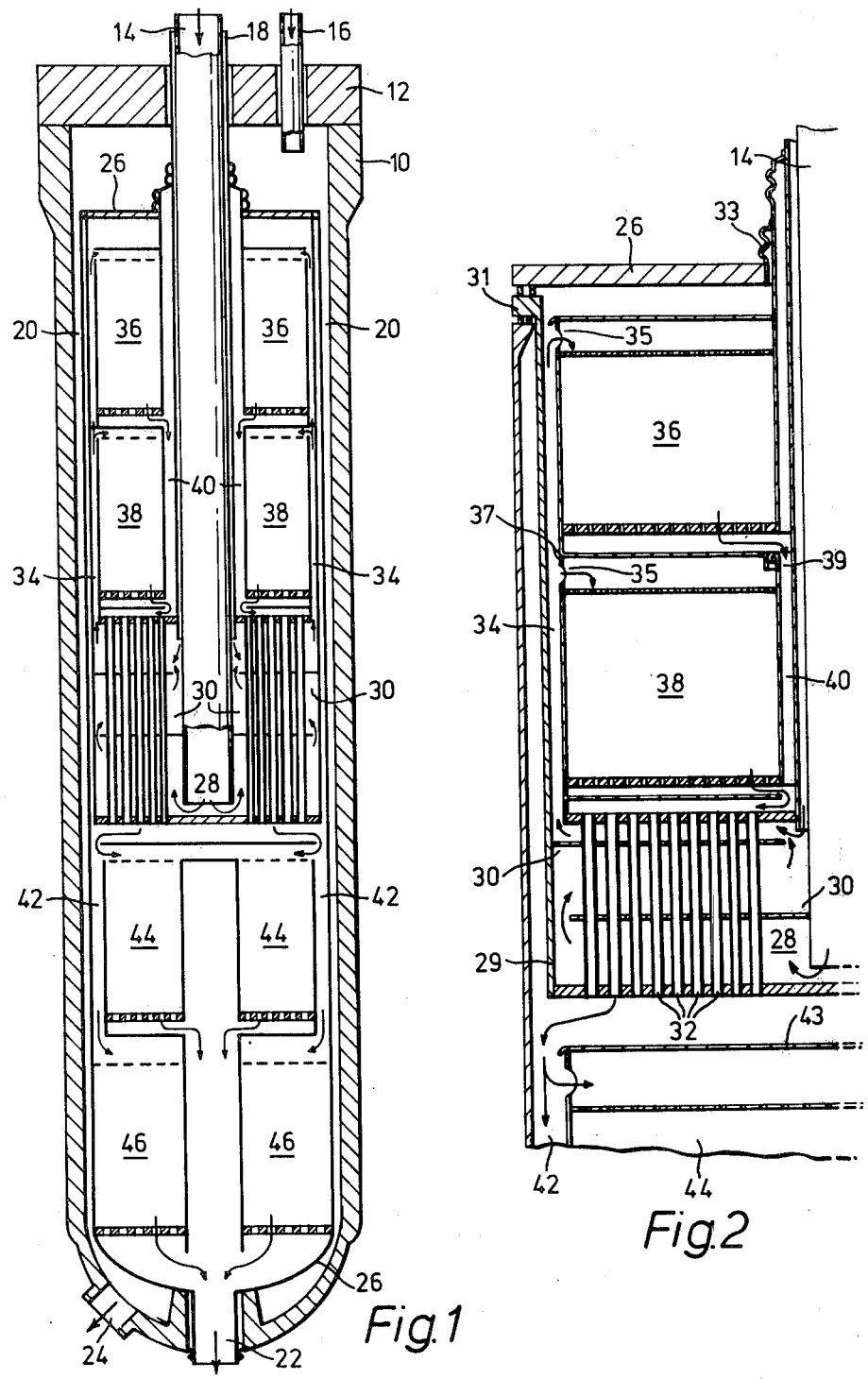
FIG. 2 is a sectional elevation showing details of the catalyst beds and heat exchanger.

The reactor in FIG. 1 includes pressure-resisting shell 10 equipped with full-bore closure 12. Closure 12 includes apertures for main feed gas inlet 14 and cool gas inlets 16 (to space 20) and 18 (by-passing heat exchanger 28). Shell 10 includes apertures for main reacted gas outlet 22 and cool gas outlet 24. Other apertures, such as those for temperature sensors, and features providing for gas-tight sealing of the closure and apertures, have been omitted from the drawing in the interests of simplicity. Within shell 10 cartridge 26 is coaxially spaced (20) from the shell walls so as to allow cool gas from inlet 16 to pass through and thus prevent overheating of shell 10. Cartridge 26 includes in its central portion heat exchanger 28 of the tube-in-shell type. Gas inlet 14 feeds into the shell (cold) side of heat exchanger 28 and the fed gas is guided by baffles 30 about tubes 32 the inside of which constitute the hot side of heat exchanger 28. Above heat exchanger 28 are disposed annular-section catalyst beds 36 and 38 constituting with their headers the upstream parallel set. The shell side of heat exchanger 28 feeds at its outer periphery upwards into the inlet header constituted by annular-section space 34 and thence centripetally into the top of beds 36 and 38. (Note that, whereas two beds are shown, three or more could be used). The outlet from beds 36 and 38 is by way of their bottom grids and centripetally into sleeve 40 (constituting the outlet header means) and thence into the space above the inlets to tubes 32 (not labelled in FIG. 1). Gas passes through tubes 32 countercurrent to its flow in the shell-side of heat exchanger 28 and is then guided outwardly to the inlet of annular space 42 from which it enters catalyst beds 44 and 46. (Again, whereas two beds are shown, three or more could be used, those other than the bottom-most one being within a continuation of space 42). The outlet from beds 44 and 46 is by way of their bottom grids and centripetally into outlet tube 22.

It is evident that beds 36 and 38 and others that may be used are operated in parallel and consequently do not afford a high pressure drop. The same applies to beds 44 and 46 and any others that may be used downstream of the heat exchanger 28. Thus in order to design a reactor for a particular output it is necessary only to choose the number of beds and thus the length of the shell, while keeping the diameter of the shell constant.

In the more detailed construction of the catalyst beds and heat exchanger shown in FIG. 2, the items denoted by even numbers are the same as in FIG. 1. Item 31 is an upper flange supporting heat exchanger 28 and catalyst beds 36 and 38 within cartridge 26. Inlet header means 34 surrounding beds 36 and 38 is defined by upward extension 33 of the inner tube of bed 36 from outlet header means 40. Bed 36 is provided by a unitary annular vessel having a lid, upper inlets 35 and lower outlets. Its bottom outer edge is supported by an upward extension of bed 38 at seating 37, which is annular and is the basis of the continuous structure of beds. Downward inner extensions form part of seal 39 which is the basis of the continuous inner tube constituting outlet header 40. Bed 38 is similar to bed 36 except that its bottom outer edge is welded gas-tight to an annular upward extension of heat exchanger 28. It is evident that beds 36 and 38 can be identical in structure. In each bed as shown, the dotted line indicates the top of the catalyst charge and the position of any apertured plate for flow control.

Heat exchanger 28 includes outer cylinder 29 which extends to upper flange 31 at the top of cartridge 26 and defines the inlet header means and the flow communication from the space outside tubes 32 to the inlets 35 of beds 36 and 38. The inlet header to tubes 32 is an extension of bed outlet header 40. The outlet header of tubes 32 is defined by lid 43 of bed 44, directing gas into the inlet header 42 of the catalyst bed set beneath heat exchanger 28.

Figure 3:
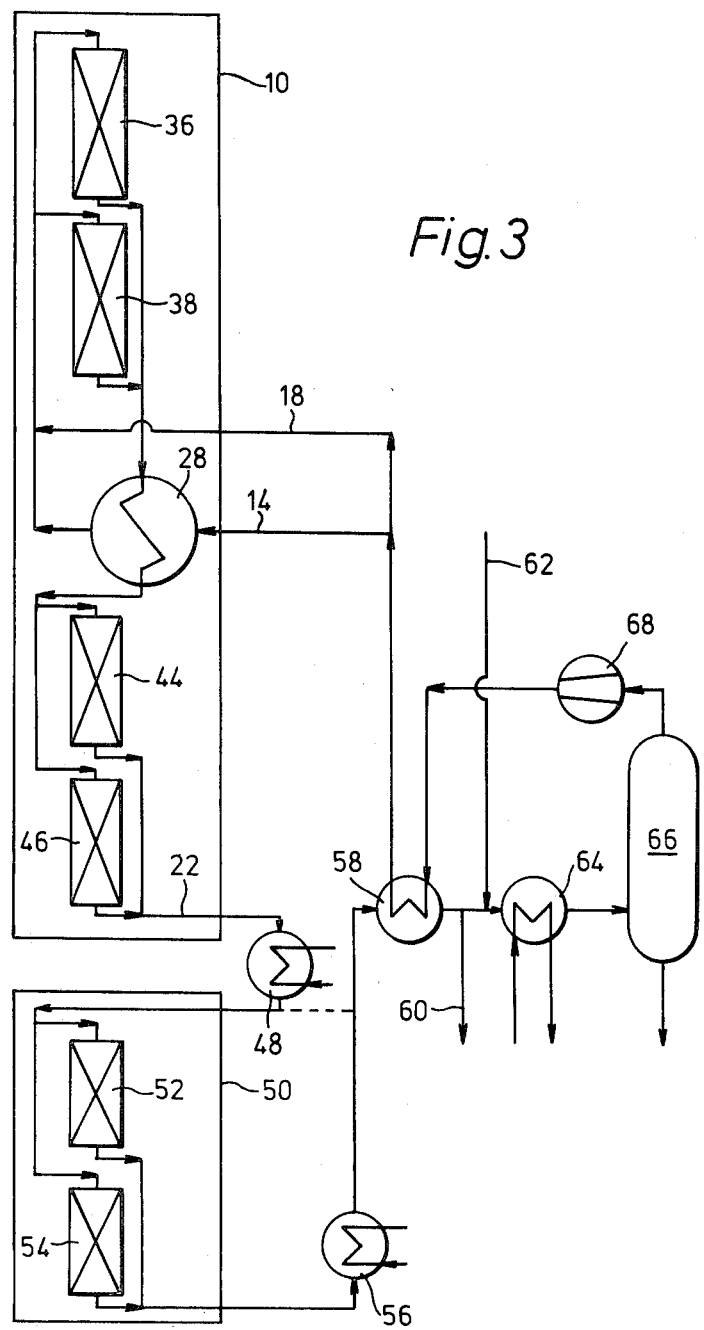
FIG. 3 is a flowsheet of an ammonia synthesis process using the reactor.

In the process flowsheet of FIG. 3, similar numerals represent the same items as in FIGS. 1 and 2. Warm synthesis gas, to be described further below, is fed into the reactor mainly through aperture 14 in shell 10 and is heated in the shell side of heat exchanger 28 to the temperature required at the inlet to the synthesis catalyst. A variable minor stream of warm synthesis gas enters the reactor via aperture 18 and is united with the main gas stream downstream of heat exchanger 28, so as to control the temperature of the gas entering the catalyst. The mixed gas is divided and flows through catalyst beds 36 and 38 in parallel. The reacted gas leaving beds 36 and 38 is hotter as a result of the exothermic synthesis reaction and is now cooled in the tubes of heat exchanger 28 by the incoming warm gas outside the tubes, to the temperature required at the inlet of catalyst beds 44 and 46. (Note that inside shell 10 more than two catalyst beds could be present upstream or downstream of heat exchanger 28; suitably two beds are present upstream and three downstream). The gas passes through beds 44 and 46 and any additional beds in parallel and the reacted gas is then re-united and passed out of the reactor at aperture 22 and into boiler 48 in which it is cooled in heat exchange with pressurised boiler feed water. The output of boiler 48 can be steam at pressures over 30 atm. abs., for example, 50-150 atm. abs. The gas is thereby cooled but not to below catalyst inlet temperature, since (according to the process shown in full lines, rather than the dotted line) it is now passed into a further catalytic stage in beds 52 and 54 again in parallel. Beds 52 and 54 could be in the same reactor shell as beds 36, 38, 44 and 46 but in a large-output plant are more conveniently in a separate shell 50 so as not to require a very tall reactor. (The use of beds 52 and 54 is made possible by the low pressure drop in the parallel catalyst beds). The gas leaving beds 52 and 54 has been further heated by the exothermic reaction and is now cooled in boiler 56, which conveniently generates steam at the same pressure as boiler 48. Gas leaving boiler 56 is cooled further at 58 by heat exchange with cold synthesis gas to be fed to the main reactor at points 14 and 18. A minor "purge" stream of cooled gas is taken at 60 in order to prevent an excessive build-up of the proportion of nonreacting gases in the process; stream 60 is treated, by means not shown, to recover ammonia from it and then discarded by use as a fuel or hydrogenating gas. To the main stream of cooled gas is now added a stream of fresh synthesis gas from a generation plant and compressor of known type (not shown). The mixture is cooled in the chilling system indicated generally by exchanger 64 to below the dewpoint of ammonia and passed to separator 66 from which liquefied product ammonia is taken off at the bottom and the mixture of fresh and unreacted gas at the top. The gas mixture is fed to recycle compressor 68 and then heated in two main stages to catalyst inlet temperature. The first main heating stage is by heat exchange with boiler effluent gas in exchanger 58. The second main heating stage is by heat exchange with hot reacted gas in exchanger 28 after the first catalyst beds 36 and 38. It will be understood that the process as practised industrially will include minor heat exchanges such as between cold gas mixture leaving separator 66 and cool reacted gas entering the chilling system indicated by 64 and between cold or partly-warmed gas mixture and the reactor cartridge in space 20 shown in FIG. 1.

The Table shows the temperatures and pressures for a typical process according to the invention, without the second downstream bed set in reactor shell 50, that is, following the dotted path in FIG. 2, and using three beds in the first downstream set. The catalyst volume is 12.5 m³ in total for the upstream set of beds and 20.3 m³ in the downstream set. The output of ammonia is 1000 metric tons per day from an inlet gas stream at position 14 at the rate of 431345 Nm³/hour. The output of steam from boiler 48 at a pressure of 100 atm. abs., is 50 metric tons per hour.

TABLE

| Position | Temperature °C. | Pressure bar | Ammonia % v/v |
|---|---|---|---|
| 14 | 45 | 241 | 3 |
| 36, 38 (inlet) | 380 | 240 | 3 |
| 36, 38 (outlet) | 520 | 239.5 | 12 |
| 44, 46 (inlet) | 380 | 238 | 12 |
| 44, 46 (outlet) | 460 | 237.5 | 18 |

The pressure drop through the catalyst is only 1 bar, compared with 5–6 bars from the catalyst in a conventional quench reactor. The increase in ammonia concentration from 3% to 18% is usefully greater than could be obtained using the conventional quench reactor (15% at outlet).

I claim:

1. An ammonia synthesis reactor comprising
   (a) a cylindrical outer shell, having at least one gas inlet substantially concentric with said shell, and at least one gas outlet; said outer shell being capable of sustaining pressure in the range of about 100 to 500 atm. abs.;
   (b) at least two axial catalyst bed sets, including an upstream bed set and a downstream bed set; each bed set consisting of a plurality of adiabatic catalyst beds; each bed having an inlet and an outlet mutually separated in a direction axial of said cylindrical outer shell, in combination with inlet header means disposed to feed the catalyst beds in parallel and with outlet header means disposed to receive gas from the catalyst beds in parallel;
   (c) a heat exchanger having a cold side in flow communication with said at least one gas inlet of the outer shell and having a hot side in flow communication with the outlet of the upstream bed set and the inlet of the downstream bed set; and
   (d) a flow connection from the downstream bed set to a gas outlet of the outer shell.

2. A reactor according to claim 1 in which each bed set contains from two to five beds.

3. A reactor according to claim 1 wherein said catalyst beds are annular having an outer cylinder and inner axial tube; and wherein the ratio of axial length to mean diameter in each catalyst bed is in the range of 0.6 to 1.5, mean diameter being defined by the formula $$D = \sqrt{D_0^2 - D_1^2}$$

where D is the mean diameter, $D_0$ is the internal diameter of the outer cylinder of the catalyst bed, and $D_1$ is the external diameter of the inner axial tube of the catalyst bed.

4. A reactor according to claim 1 in which the inlet header means feeding an axial bed set is provided by an annular-section space at the periphery of the beds and the outlet header means fed by the beds is one or more axial tubes within the beds.

5. The combination of a reactor according to claim 1 with cooling means which is a boiler or boiler feed water heater in flow communication with the outlet of the downstream catalyst bed set.

6. A combination according to claim 5 including a further axial catalyst bed set downstream of the cooling means.

7. A reactor according to claim 1 in which said catalyst beds in said axial bed sets are separable and removable from the reactor while containing their charge of catalyst.

8. A reactor according to claim 7 in which at least one catalyst bed comprises
   (a) an outer cylinder;
   (b) at least one tube disposed within the outer cylinder and parallel to its axis;
   (c) a catalyst support grid transversely disposed between the outer cylinder and the tube or tubes and defining the bottom of a space to hold catalyst;
   (d) above the said space at least one inlet port in the outer cylinder or in the tube or tubes;
   (e) below the catalyst support grid, at least one outlet port in the outer cylinder or in the tube or tubes;
   (f) extensions formed on the outer cylinder to co-operate with a generally similar component above or below to form a continuous structure within an external cylinder defining an external header means; and
   (g) extensions of the tube or tubes formed to co-operate with similar tube or tubes of a bed in a different vertical position to form a continuous tube or tubes.

9. A reactor according to claim 8 wherein said heat exchanger comprises
   (a) an outer cylinder;
   (b) a lower tube-plate secured gas-tightly to the bottom of the outer cylinder and formed with tube holes;
   (c) an upper tube-plate spaced from the lower tube-plate and formed with tube-holes corresponding to those in the lower tube plate;

(d) a plurality of tubes extending between the tubeplates;
(e) inlet and outlet means to the space outside the tubes;
(f) inlet and an outlet header means to the tubes;
(g) extensions formed on the outer cylinder to cooperate structurally with the outer cylinder of a catalyst bed of an axial bed set and disposed in a different vertical position from the heat exchanger;
(h) means to connect the outlet of the space outside the tubes to said inlet header means of the catalyst beds upstream of the heat exchanger;
(i) means to connect the tube inlet header means to the outlet header means of the catalyst beds upstream of the heat exchanger;
(j) means to connect the tube outlet header means to the inlet header means of the catalyst beds downstream of the heat exchanger.

10. A reactor according to claim 9 in which the catalyst bed immediately above the heat exchanger is welded to it.

* * * * *